(12) United States Patent
Kugler et al.

(10) Patent No.: US 12,120,552 B2
(45) Date of Patent: Oct. 15, 2024

(54) ENHANCED PACKET FILTERING

(71) Applicant: Apple Inc., Cupertino, CA (US)

(72) Inventors: Martin Kugler, Poing (DE); Vijay Venkataraman, San Jose, CA (US); Ahmed Soud Salem, Ottobrunn (DE); Mathias Kohlenz, San Diego, CA (US); Sandeep Urgaonkar, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/357,012

(22) Filed: Jul. 21, 2023

(65) Prior Publication Data

US 2023/0362734 A1 Nov. 9, 2023

Related U.S. Application Data

(62) Division of application No. 17/446,100, filed on Aug. 26, 2021, now Pat. No. 11,792,690.

(51) Int. Cl.
*H04W 28/10* (2009.01)
*H04W 76/10* (2018.01)

(52) U.S. Cl.
CPC .......... *H04W 28/10* (2013.01); *H04W 76/10* (2018.02)

(58) Field of Classification Search
CPC ........ H04L 47/10; H04L 47/19; H04W 28/02; H04W 28/10; H04W 76/10
See application file for complete search history.

(56) References Cited

U.S. PATENT DOCUMENTS

| | | | |
|---|---|---|---|
| 9,729,527 B2* | 8/2017 | Goyal | H04L 69/02 |
| 9,787,589 B2* | 10/2017 | Vyas | H04L 63/02 |
| 10,313,240 B2 | 6/2019 | Gobriel | |
| 10,333,807 B2 | 6/2019 | Egner | |
| 10,341,853 B2 | 7/2019 | Edge | |
| 10,542,454 B2 | 1/2020 | Jheng | |
| 10,567,437 B2* | 2/2020 | Rogers | H04L 67/02 |
| 10,608,710 B2 | 3/2020 | Yiu | |
| 10,764,162 B2* | 9/2020 | Rao | H04L 41/40 |
| 10,798,754 B2 | 10/2020 | Pan | |
| 10,880,206 B2* | 12/2020 | Wei | H04L 45/7453 |
| 10,893,434 B2 | 1/2021 | Liu | |
| 2019/0312911 A1* | 10/2019 | Rogers | H04L 63/06 |
| 2020/0037197 A1 | 1/2020 | Cho | |
| 2020/0059485 A1* | 2/2020 | Ergin | H04L 47/2441 |
| 2020/0100136 A1 | 3/2020 | Chang | |
| 2020/0154304 A1 | 5/2020 | Cho | |
| 2020/0169913 A1 | 5/2020 | Byun | |
| 2020/0275302 A1 | 8/2020 | Youn | |
| 2020/0374948 A1 | 11/2020 | Pan | |

(Continued)

FOREIGN PATENT DOCUMENTS

WO 2018125686 7/2018

*Primary Examiner* — Alpus Hsu
(74) *Attorney, Agent, or Firm* — Kowert, Hood, Munyon, Rankin & Goetzel, P.C.

(57) ABSTRACT

This disclosure relates to techniques for performing wireless communications including filtering packets for transmission between a user equipment (UE) and a base station. Techniques for filtering packets, at a lower layer and/or baseband processor, using higher layer information, such as a flow identifier, are disclosed. A device may generate various tables and may use the tables to filter packets efficiently.

20 Claims, 7 Drawing Sheets

(56) References Cited

U.S. PATENT DOCUMENTS

| | | | |
|---|---|---|---|
| 2020/0401459 A1* | 12/2020 | Tamir | G06F 9/5027 |
| 2021/0044529 A1* | 2/2021 | Salem | H04L 43/026 |
| 2021/0083981 A1* | 3/2021 | Shmilovici | H04L 45/74 |
| 2021/0092668 A1 | 3/2021 | Zaus | |
| 2021/0100061 A1 | 4/2021 | Park | |

* cited by examiner

| Packet Header Attribute Information | | | | | |
|---|---|---|---|---|---|
| Attribute | Attributes extracted from packet headers | Num of Bytes | IPv4 | IPv6 | TCP/UDP/STCP | ESP, AH |
| 1 | Protocol | 1 | x | | | |
| 2 | Next Header | 1 | | x | | |
| 3 | Single Local Port Num | 2 | | | x | |
| 4 | Single Remote Local Port Num | 2 | | | x | |
| 5 | Security Parameter Index (SPI) | 4 | | | | x |
| 6 | Type of Service (IPv4) | 1 | x | | | |
| 7 | Traffic Class | 1 | | x | | |
| 8 | Flow Label (IPv4) | 3 | | x | | |
| 9 | IPv4 Local addr (4B) | 4 | x | | | |
| 10 | IPv4 Remote addr (4B) | 4 | x | | | |
| 11 | IPv6 local addr (16B) | 16 | | x | | |
| 12 | IPv6 remote addr (16B) | 16 | | x | | |
| Additional Values provided as part of rule | | | | | | |
| | IPv4 Local addr mask | 4 | x | | | |
| | IPv4 remote addr mask | 4 | x | | | |
| | IPv6 local addr prefix (1B) | 1 | | x | | |
| | IPv6 remote addr prefix (1B) | 1 | | x | | |
| | Local port Num range (low, upper) | 4 | | | x | |
| | Remote port Num range (low, up) | 4 | | | x | |
| | TOS mask | 1 | x | | | |

FIG. 6

ENHANCED PACKET FILTERING

PRIORITY INFORMATION

This application is a divisional of U.S. patent application Ser. No. 17/446,100, entitled "Enhanced Packet Filtering," filed Aug. 26, 2021, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless communication, including to filtering of packets, e.g., prior to transmission.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost, low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. One characteristic may be filtering of packets to separate flows or bearers, etc. Improvements in the field are desired.

SUMMARY

Embodiments are presented herein of, inter alia, systems, apparatuses, and methods for performing packet filtering and related communications in a wireless communication system, e.g., New Radio (NR), LTE, etc.

As noted above, the number of use cases for wireless networks communicating with different classes of user equipment devices (UEs) with widely variable capabilities and usage expectations are growing. One usage expectation may include filtering and/or mapping communications onto various bearers or flows (e.g., to different destinations and/or with different quality of service attributes). Devices may exchange configuration information and determine appropriate techniques and parameters for packet filtering.

In some embodiments, a user equipment (UE) may establish communication with a base station and exchange configuration information with the base station (BS) for a plurality of packet filters. The UE may generate, at a higher layer, a first uplink packet for transmission to the base station and may determine, at the higher layer, that the first uplink packet is associated with a first flow identifier. At a lower layer, the UE may determine that the first flow identifier is associated with a first rule index in a flow database. In response to the determination that the first flow identifier is associated with the first rule index in the flow database, the lower layer may evaluate header information of the first uplink packet according to one or more rules of a secondary table, wherein the one or more rules of the secondary table are associated with the first rule index. The lower layer may determine, based on the evaluation of the header information of the first uplink packet using the one or more rules of the secondary table, that the first uplink packet matches a first packet filter of the plurality of packet filters. In response to the determination that the first uplink packet matches the first packet filter, the UE may transmit the first uplink packet to the base station using a flow associated with the first packet filter.

In some embodiments, a lower layer of a transmitting device may configure a plurality of rules for filtering packets. The plurality of rules may be useable to evaluate respective packets based on respective header information of the respective packets, the respective header information of the respective packets comprising a plurality of fields. The lower layer may generate a first table comprising a first subset of the plurality of rules, wherein respective rules of the first subset of the plurality of rules may be based on a first subset of the plurality of fields usable to determine respective flow identifiers for respective packets. The lower layer may generate a second table comprising a second subset of the plurality of rules disjoint from the first subset of the plurality of rules, wherein respective rules of the second subset of the plurality of rules may be based at least in part on a second subset of the plurality of fields not usable to determine respective flow identifiers for respective packets. The lower layer may filter at least one packet according to the first table and the second table. The lower layer may transmit the at least one packet according to a result of the filtering.

In some embodiments, an apparatus may cause a UE to establish communication with a base station and receive, from the base station, configuration information for a plurality of packet filters. The UE may generate a first uplink packet for transmission to the base station and determine that the first uplink packet is associated with a first flow identifier. The UE may determine that the first flow identifier is associated with a first rule index in a flow database, and, in response to the determination that the first flow identifier is associated with the first rule index in the flow database, determine that the first uplink packet satisfies a first rule associated with the first rule index in a primary table without evaluating the first uplink packet using the first rule. The UE may select, based on the determination that the first uplink packet satisfies the first rule, one or more rules of a secondary table, wherein the one or more rules of the secondary table are associated with the first rule. The UE may evaluate the first uplink packet using the one or more rules of the secondary table and determine, based on the evaluation of the first uplink packet using the one or more rules of the secondary table, that the first uplink packet matches a first packet filter of the plurality of packet filters. In response to the determination that the first uplink packet matches the first packet filter, the UE may transmit, to the base station, the first uplink packet using a flow associated with the first packet filter.

The techniques described herein may be implemented in and/or used with a number of different types of devices, including but not limited to mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 6 illustrates possible fields of a header which may be considered within a filter rule, according to some embodiments.

Figure 1:
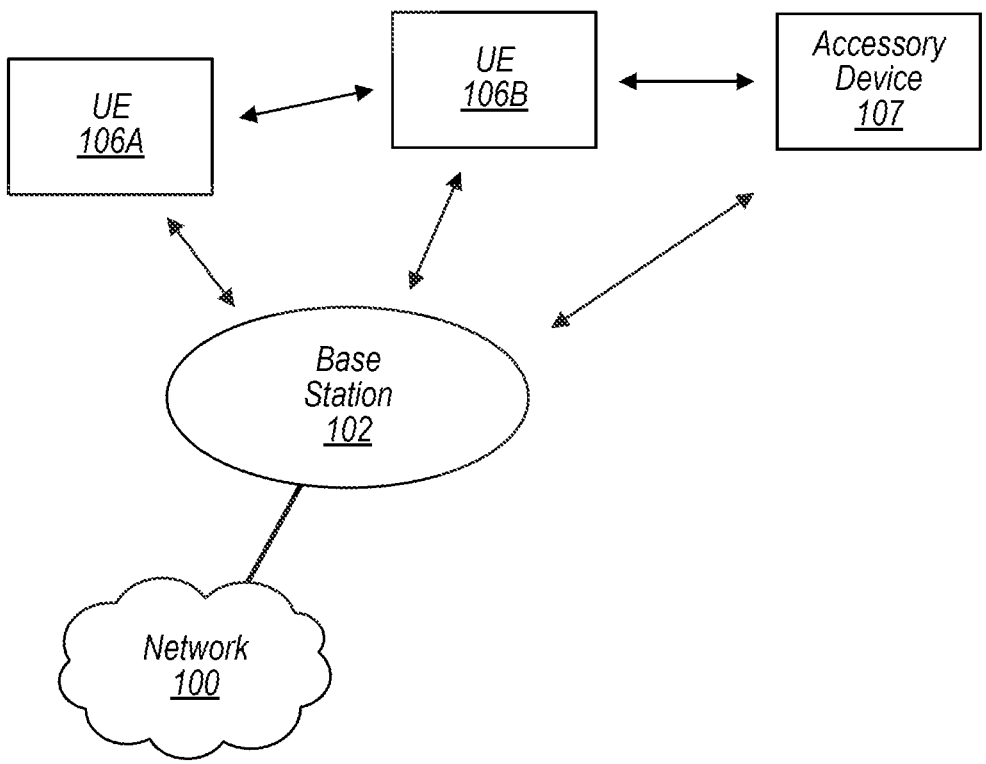
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms and Abbreviations

The following acronyms and abbreviations are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution
RRC: Radio Resource Control
MAC: Media Access Control
CE: Control Element
Tx: Transmission (or transmit)
Rx: Reception (or receive)
RS: Reference Signal
CSI: Channel State Information
PDCP: packet data convergence protocol
RLC: radio link control Terminology The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well as any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
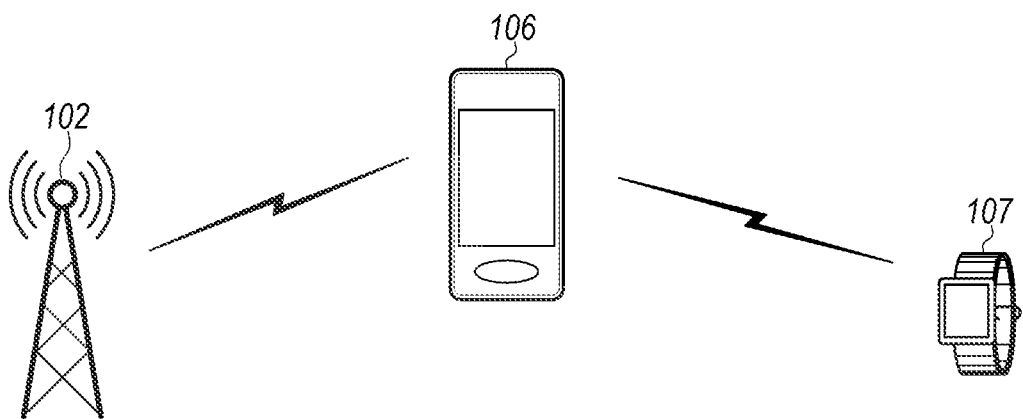
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware and/or software that enables wireless communication with the UE devices 106A, 106B, and 107. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. As also used herein, from the perspective of UEs, a base station may sometimes be considered as representing the network insofar as uplink (UL) and downlink (DL) communications of the UE are concerned. Thus, a UE communicating with one or more base stations in the network may also be interpreted as the UE communicating with the network.

In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1xRTT, 1xEV-DO, HRPD, cHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi. In some instances, the UE 106B and the accessory device 107 may perform direct peer-to-peer communication using proximity services (ProSe) techniques, e.g., in a manner supported by a cellular base station. For example, such ProSe communication may be performed as part of a relay link to support a radio resource control connection between the accessory device 107 and the BS 102, such as according to various embodiments described herein.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, it may be the case that the UE 106A and UE 106B are capable of arranging and performing D2D communication (e.g., including discovery communications) with each other even when out-of-coverage of the BS 102 and other cellular base stations.

The BS 102 may control one or more transmission and reception points (TRPs) and may use the TRPs to communicate with the UEs. The TRPs may be collocated with the BS and/or at separate physical locations.

FIG. 2 illustrates an example BS 102 in communication with a UE device 106, which in turn is in communication with an accessory device 107. The UE device 106 and accessory device 107 may be any of a mobile phone, a tablet, or any other type of hand-held device, a smart watch or other wearable device, a media player, a computer, a laptop, unmanned aerial vehicle (UAV), unmanned aerial controller, vehicle, or virtually any type of wireless device. In some embodiments, the accessory device may be a wireless device designed to have low cost and/or low power consumption, and which may benefit from use of a relay link with the UE device 106 (and/or another companion device) to support communication with the BS 102. A device that utilizes a relay link with another wireless device to communicate with a cellular base station, such as in the illustrated scenario of FIG. 2, may also be referred to herein as a remote wireless device, a remote device, or a remote UE device, while a wireless device that provides such a relay link may also be referred to herein as a relay wireless device, a relay device, or relay UE device. According to some embodiments, such a BS 102, UE 106, and accessory device 107 may be configured to perform radio resource control procedures for remote wireless devices in accordance with various of the techniques described herein.

The UE 106 and accessory device 107 may each include a device or integrated circuit for facilitating cellular communication, referred to as a cellular modem. The cellular modem may include one or more processors (processing elements) that is configured to execute program instructions stored in memory, and/or various hardware components as described herein. The UE 106 and/or accessory device 107 may each perform any of the method embodiments described herein by executing such stored instructions. Alternatively, or in addition, the UE 106 and/or accessory device 107 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or accessory device 107 may include one or more antennas for communicating using one or more wireless communication protocols according to one or more RAT standards. In some embodiments, one or both of the UE 106 or accessory device 107 might be configured to communicate using a single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

Alternatively, the UE 106 and/or accessory device 107 may include two or more radios. For example, in some embodiments, the UE 106 and/or accessory device 107 may include separate transmit and/or receive chains (e.g., including separate antennas and other radio components) for each wireless communication protocol with which it is configured to communicate. As a further possibility, the UE 106 and/or accessory device 107 may include one or more radios that are shared between multiple wireless communication protocols, and one or more radios that are used exclusively by a single wireless communication protocol. For example, the UE 106 and/or accessory device 107 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
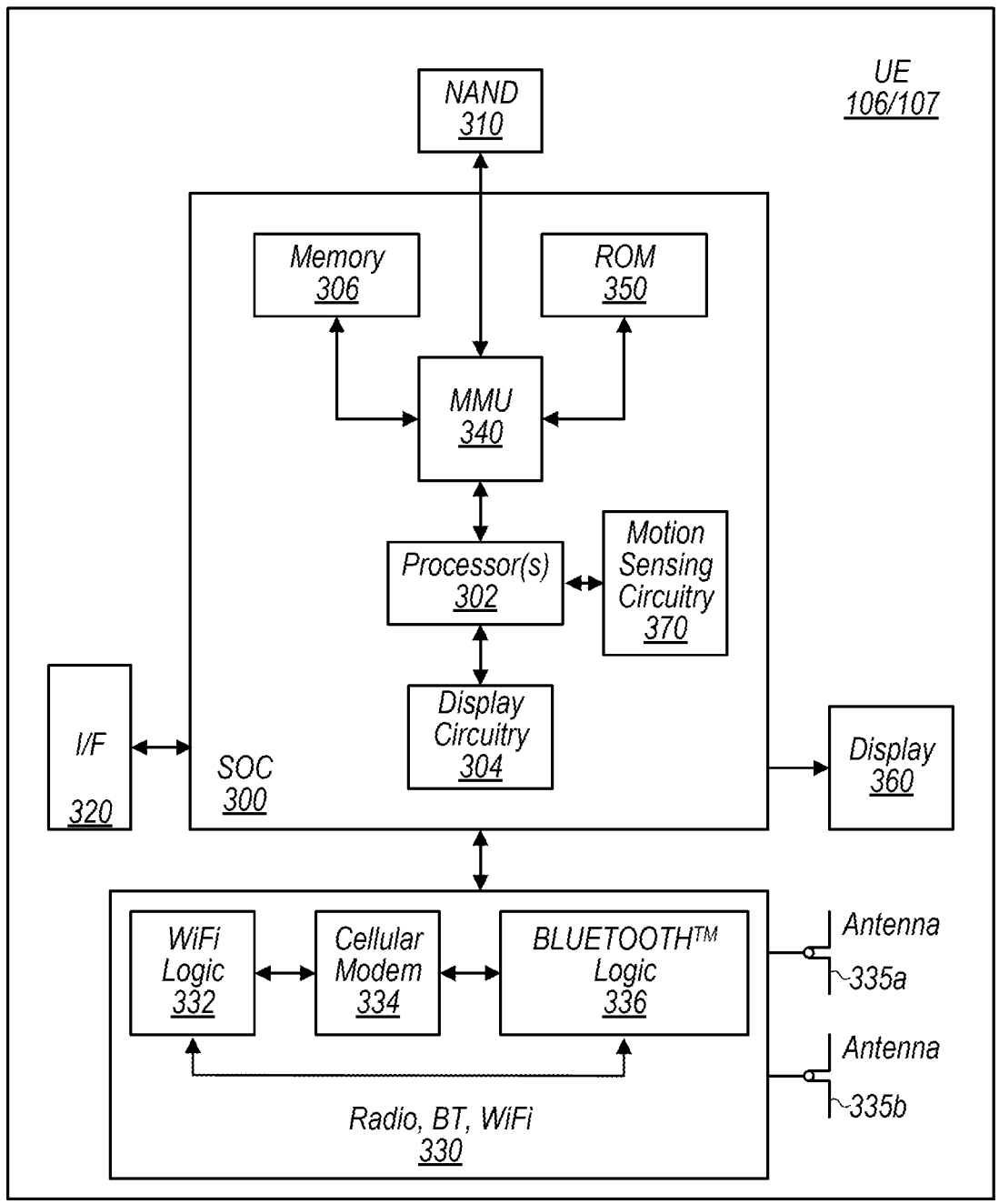
FIG. 3 is a block diagram illustrating an example wireless device, according to some embodiments.

FIG. 3—Block Diagram of a UE Device

FIG. 3 illustrates one possible block diagram of a UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310), and/or to other circuits or devices, such as the display circuitry 304, radio 330, I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A. NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using multiple wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. The processor(s) 302 of the UE device 106/107 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform radio resource control procedures for remote wireless devices according to various embodiments disclosed herein. Processor(s) 302 may also implement various other applications and/or end-user applications running on UE 106. Alternatively or additionally, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
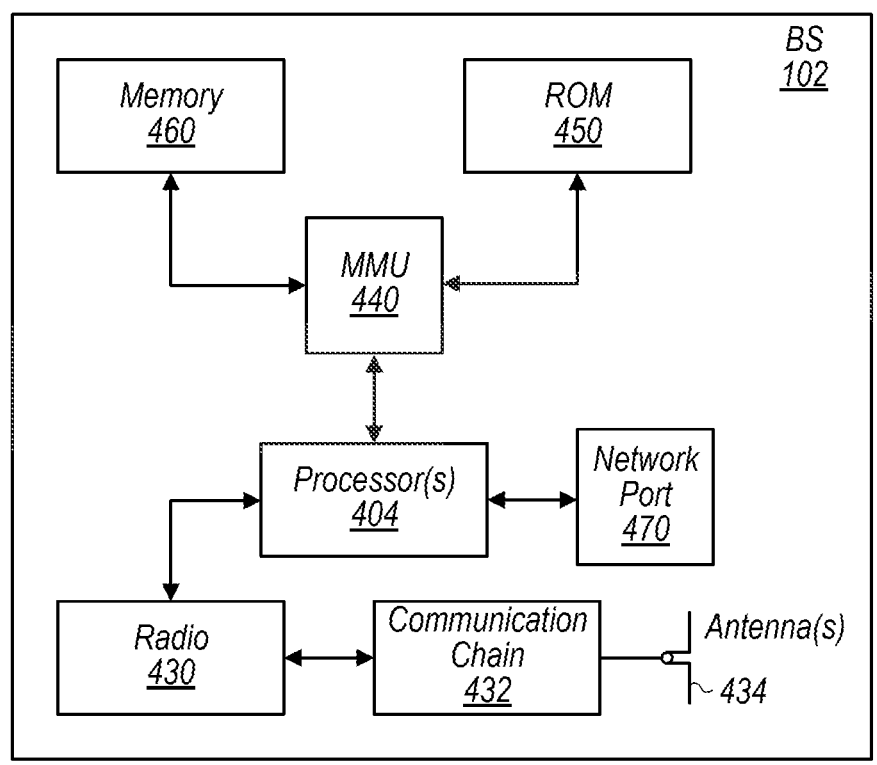
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of radio resource control procedures for remote wireless devices according to various embodiments disclosed herein, and/or any of various other of the features described herein.

Figure 5:
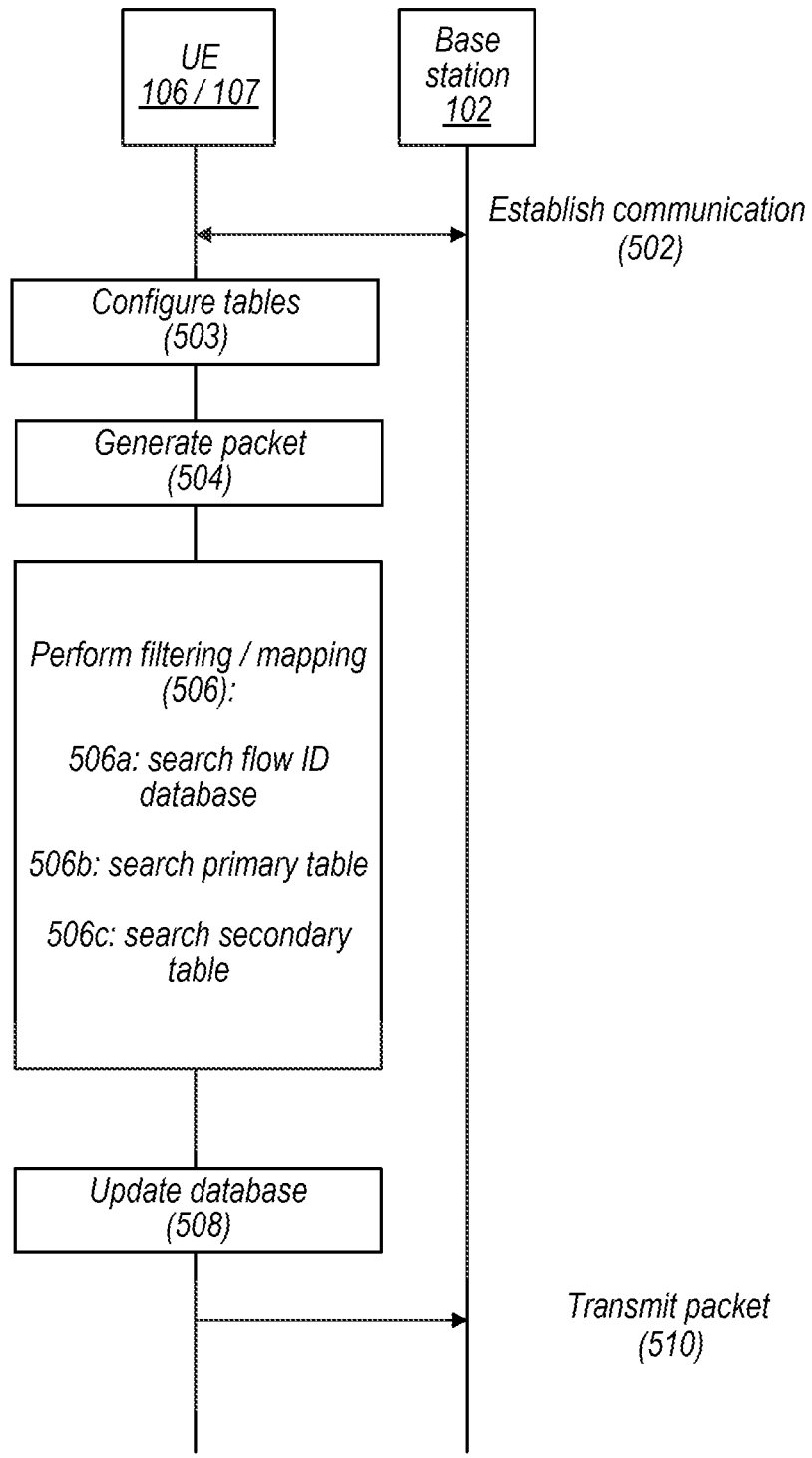
FIG. 5 is a communication flow diagram illustrating an example method for performing enhanced filtering, according to some embodiments.

FIG. 5—Packet filtering

Non-access stratum (NAS) packet filtering may be a means of routing individual packets to different flows or bearers. For example, 3GPP standards may describe how NAS may create filtering rules during packet data protocol (PDP) context activation or modification. A UE and/or BS may execute such filtering for any packet to be transmitted or received, e.g., both in uplink and downlink directions. With these filters (e.g., rules) data flows can be categorized and mapped to a specific destination and/or quality of service (QOS). In other words, packets may be filtered into different groups based on the packet filtering. Different groups of packets may be handled differently. For example, packets that satisfy one filter may be routed to one destination (e.g., via one bearer) and packets that satisfy a different filter may be routed to a different destination (e.g., via a different bearer). In some embodiments, packets that satisfy one filter may be routed to one destination (e.g., via a first bearer) and packets that satisfy a different filter may be routed to the same destination (e.g., via a different bearer with a different QoS than the first bearer).

In some 3GPP standards (e.g., up to 4G) filtering may be in specified within Traffic Flow Template (TFT). For example, see technical specification (TS) 24.008, sec. 10.5.6.12. From 5G onwards, filtering may be specified as QoS flow identifier (QFI) rules (see TS 23.501, sec. 5.7.6).

The filtering process may lead to a matching result (e.g., a matching identifier (matching-ID)). Depending on the available core network (CN) the matching result may be a combination of a bearer identifier and a network service access point identifier (NSAPI) (e.g., for 2G, 3G or 3G CNs), combination of a bearer identifier and an evolved packet service (EPS) ID (EPS-ID) (e.g., for 4G) or a combination of a bearer identifier and a QFI value (e.g., for 5G), among various possibilities. In other words, the matching result may identify a bearer and an identifier (e.g., NSAPI, EPS-ID, QFI). There may be many different possible matching results and many different filtering rules.

Filtering rules may be based on various fields, e.g., which may be found in header information of a packet. For example, an upper layer of a transmitting device (such as an application layer) may generate a packet for transmission to a receiving device. The upper layer may append header information with various fields describing the packet and/or its destination. A lower layer of the transmitting device (e.g., layer 3 (L3) may receive the packet. The lower layer may evaluate the header information using the various filtering rules. The lower layer may determine which filter the packet matches (e.g., may determine a matching result). The lower layer may append further header information (e.g., indicating the matching result). For example, a QFI value may be added to a service data adaptation protocol (SDAP) header. As another possibility, the lower layer may indicate a bearer ID for the matching bearer. The lower layer may transmit the packet on the appropriate flow or bearer (e.g., according to the matching result). For example, the filtering may be done on top of packet data convergence protocol (PDCP) and/or SDAP). In other words, filtering may be done before entering a baseband protocol stack (e.g., beginning with SDAP, PDCP, RLC, etc.).

As there may be many filter rules to evaluate and the various filter rules may rely on various combinations of fields from the header information, the filtering process may require computation time. For example, with higher complexity of a rule, more fields may need to be evaluated, which requires more cycles for computation and more memory accesses. More cycles and memory accesses may delay the filtering procedure and ultimately delay transmission of packets. Especially in the uplink direction with higher data rates in LTE and 5G, a UE doing filtering in an efficient way may reduce end-to-end latency (e.g., due to a relatively high latency contribution from uplink routing filtering).

FIG. 5 is a communication flow diagram illustrating an example method for performing packet filtering, according to some embodiments. The method of FIG. 5 may allow for evaluation of fewer rules per packet (e.g., via improved organization of the set of filtering rules and/or using available information to avoid evaluation of some rules) and thus may require fewer cycles and/or memory accesses per packet, according to some embodiments. For example, a search effort for finding a matching rule for a packet may be reduced.

In various embodiments, some of the elements of the methods shown in FIG. 5 may be performed concurrently, in a different order than shown, may be substituted for by other method elements, or may be omitted. Additional method elements may also be performed as desired.

Aspects of the method of FIG. 5 may be implemented by a UE, such as the UEs 106 or 107, a cellular network, and/or one or more BS 102, e.g., as illustrated in and described with respect to the Figures, or more generally in conjunction with any of the computer systems, circuitry, elements, components or devices shown in the Figures, among other devices, as desired. For example, one or more processors (or processing elements) (e.g., processor(s) 302, 404, baseband processor(s), processor(s) associated with communication circuitry such as 330, 332, 334, 336, 430, or 432, processors associated with various core network elements, etc., among various possibilities) may cause a UE, network element, and/or BS to perform some or all of the illustrated method elements. Note that while at least some elements of the method of FIG. 5 are described in a manner relating to the use of communication techniques and/or features associated with LTE, NR, and/or 3GPP specification documents, such description is not intended to be limiting to the disclosure, and aspects of the method of FIG. 5 may be used in any suitable wireless communication system, as desired. Similarly, while at least some elements of the method of FIG. 5 are described in a manner relating to uplink transmissions performed by a UE, it will be appreciated that aspects of the method of FIG. 5 may similarly be used for downlink transmissions performed by a BS and/or between multiple UEs (e.g., sidelink and/or device to device (D2D) transmissions, etc.). For example, any type of transmitting device may use aspects of the method of FIG. 5, according to some embodiments. As shown, the method may operate as follows.

The UE and the BS may establish communication (502), according to some embodiments. The UE and the BS may communicate using one or more radio access technologies (RATs), e.g., including NR. The UE and the BS may communicate using any frequency resources. The UE and the BS may communicate using one or more frequency carriers, e.g., including licensed and/or unlicensed carriers. The BS may provide one or more cell and/or cell groups and the communication between the UE and the BS may use one or more cell and/or cell group.

The BS may exchange configuration information with the UE. For example, the BS may use radio resource control (RRC) and/or other higher layer signaling to negotiate parameters with the UE and/or to configure the UE. Among various possibilities, the configuration information may include various parameters relevant to packet filtering, etc.

As part of the exchange of configuration information, the UE and BS may configure any number of flows and/or bearers. The UE and BS may configure any number of filter rules for matching packets to the flows. The filter rules may be based on various fields included in header information of packets (see FIG. 6, as an example of potential fields used in filter rules). As one example rule, in a 5G network all packets within a specific port number may be mapped to a particular QFI (e.g., a rule based on one field: port number, e.g., of a remote device). As another example rule, in a LTE CN, Virtual Private Network (VPN) packets with a security parameter index (SPI) value of 13 may be mapped to EPS-ID 7. For example, the BS may transmit configuration information to the UE describing any number of filter rules to be used by the UE in processing uplink packets for transmission to the BS and/or in processing downlink packets received from the BS.

The configuration may include identifying bearers with bearer IDs. For example, a default bearer may be identified with a default bearer ID. In some embodiments, a special bearer ID may be configured, e.g., so that the special bearer ID indicates that a packet should be dropped.

The configuration information may further include an indication of the relative importance of the various filter rules, e.g., precedence values. For example, precedence values may be provided by NAS and/or service data adaptation protocol (SDAP) with each rule. Such precedence values may be negotiated or may be provided from the BS to the UE. The precedence values may describe a hierarchy of the different filters. For example, if a first filter has a higher precedence than a second filter, then a packet that meets the criterion (criteria) of the first filter may be handled according to the first filter regardless of whether the packet also meets the criterion (criteria) of the second filter.

In some embodiments, the UE may provide information (e.g., a capability report) to the BS describing its capabilities related to packet filtering. For example, the UE may provide information about its processing timeline, database of rules, etc.

In some embodiments, the configuration information may be updated from time to time (e.g., periodically or as needed). For example, a bearer or application being activated on de-activated may lead to or otherwise be associated with a change in the configuration information. Such an update may be initiated by the UE and/or BS. Such an update may include deleting, adding, modifying, and/or replacing one or more rules.

In some embodiments, the configuration information may be specific to a packet data network (PDN) session. Different PDN sessions may have the same or different configurations, e.g., simultaneously and/or at different times. For example, different sets of filter rules may be used for different PDN sessions.

The UE (or other transmitting device) may configure one or more tables and/or databases for mapping packets to corresponding matching results (503), according to some embodiments. For example, the UE may configure a pair of tables of filter rules. The tables may divide the filter rules into two (e.g., mutually exclusive) groups, e.g., based on the fields considered by the rules. For example, the filter rules may be separated between the tables based on whether or not the filter rule uses only those fields which may be used to determine a flow identifier (flow ID). Such a pair of tables may be configured for each of any number of versions of internet protocol (IP), e.g., one pair for IP version 4 (IPv4) and one pair for IPV6. It will be appreciated that each table of the pair of tables may be subdivided into different portions for the various versions of IP (e.g., one table may include an IPV4 portion and an IPV6 portion). This may be very similar to having different pairs of tables and may lead to equivalent results. Either approach may be used as desired.

One table (e.g., a primary table) of the pair of tables may include filter rules based on fields (e.g., of packet header information) that are the same fields with which an upper layer (e.g., an application layer) may determine a flow ID. The flow ID may be a unique number or identifier associated with each flow by the upper layer. The flow ID may be collision free, e.g., packets of different flows may not have the same flow ID. A flow (e.g., and a corresponding flow ID) may use a particular set of source and destination addresses, may use particular services (e.g., real time traffic, interactive traffic, file download, secure shell, etc.), may use dedicated port numbers, and/or may be associated with a particular application, among various possibilities. The flow ID may be provided to a lower layer (e.g., or baseband processor, modem, etc.) by the upper layer along with the packet descriptor (e.g., packet header information).

It will be appreciated that, as used herein, the term flow ID may be distinct from a flow label, e.g., as used in certain 3GPP, Internet Engineering Task Force (IETF), and/or IPv6 documents. Unlike a flow label, which may be an IPV6 header field (e.g., and may be defined as such by IETF), a flow ID may be assigned locally (e.g., by a higher layer which may operate on an application processor). However, the flow label may be a standardized value assigned by a lower layer, e.g., according to a process described in IETF standards. For example, in contrast to the flow ID, a flow label for an IPV6 packet may be generated by a source node (e.g., at a layer executing IP operations) and may be included as a field in the IPV6 packet header. The flow label may be used to maintain the sequential flow of the packets belonging to a communication. For example, a transmitting device may label a sequence of packets using a flow label to help a router identify that a particular packet belongs to a specific flow of information. The flow label field may thus help avoid re-ordering of data packets. The flow label may be useful for streaming/real-time media, among various possibilities. The flow label may be 20 bits, among various possibilities.

The primary table may include rules based on the same information that upper layers use to categorize uplink packets into flow IDs when the (e.g., IP) packets are generated. For example, the primary table filter rules may be based on the 5-tuple values of the IP header, which may be the same fields from which a flow ID is derived. For example, source and remote address, source and remote port, and the protocol field in an IPV4, IPv6, and/or layer 4 (L4) (e.g., transmission control protocol (TCP), user datagram protocol (UDP)) header may be the parameters in the 5-tuple. For example, the 5-tuple may include: source and destination addresses (e.g., in IPv4/v6 header), fields for the next header (e.g., next_hdr) or protocol type (e.g., prot) field (e.g., identifying a protocol such as UDP. TCP, etc. in an IPV4 or IPv6 header), and source and destination ports (e.g., in TCP/UDP header). However, reference to 5-tuple is an example and the upper layers may derive a flow ID based on other fields such as SPI for IP security (IPSec) packets. Accordingly, filter rules included in the primary table may be based these other fields that may be used to derive a flow ID.

Another table (e.g., a secondary table) of the pair of tables may include filter rules based on other fields (e.g., of packet header information). In other words, the secondary table may include rules based on fields that are different from fields with which an upper layer may determine the flow ID.

In some embodiments, all of the filter rules (e.g., configured as described in 502) may be stored in either the primary table or the secondary table, e.g., according to whether all of the fields used by a respective rule are used for determining a flow ID (e.g., part of the 5-tuple). As one example, the flow ID may be derived by upper layers using the 5-tuple fields and the rules may be divided between the tables according to whether they rely on fields outside of (e.g., instead of or in addition to) the 5-tuple fields. A first filter rule which uses source address (e.g., part of 5-tuple, e.g., and possibly other fields that are part of the 5-tuple) may be stored in the primary table. A second filter rule which uses a traffic class field (e.g., which is not part of 5-tuple) may be stored in secondary table (e.g., regardless of whether the second rule also references one or more fields of the 5-tuple).

Each filter rule in the tables may be associated with a matching-ID. The matching-ID may be an indication of the flow, bearer, or other information about the manner of transmission for a packet that satisfies the filter (e.g., a packet whose header information is as defined by the filter). Depending on current core network this matching-ID may be an NSAPI, EPS-ID, or QFI value, etc.

Rule entries in each table may be sorted according to their precedence values. For example, a rule with highest precedence may be at the beginning of the table. A rule with low precedence may be at the end. If rules are added, modified, replaced, or removed, both tables may be re-sorted.

Each filter rule in the tables may be associated with a rule index. The index may relate to the position of the rule in the table, e.g., to the precedence. As noted above, both the primary and secondary tables may be further separated into IPv4 and IPV6 based rules to improve the search efficiency for a rule with a particular rule index value. Thus, packet filter rules may be separated out into 4 tables, with each of them having a subset of the rules in them. The rule index values may be used to rapidly search for a filter rule.

In some embodiments, the IPV4 and IPV6 tables may be concatenated. A special offset or rule index may be used to directly 'jump' to the beginning of the related portion of the table. For example, if the tables are concatenated, a first range of rule index values (e.g., 0-99) may be associated with a first protocol (e.g., IPv4) and a second range (e.g., 100-199) may be associated with a second protocol (e.g., IPv6). Thus, a highest precedence rule for the first protocol may be indexed at 0 and a highest precedence rule for the second protocol may be indexed at 100.

Each rule entry in the primary table may contain a field which indicates the number of rules in the secondary table which have a higher precedence value than the current rule in primary table, e.g., a maximum secondary index field. In case there is a match in primary table (e.g., a particular packet is determined to meet the criterion/criteria of the rule), rules in the secondary table with higher precedence may be checked, since they could have a higher precedence that the matched rule in the primary table. If there is a match in the secondary table (e.g., to a rule with a higher precedence than the matched rule in the primary table), then the matched rule from the secondary table may be applied instead. With this additional field in the primary table, the number of rules in the secondary table to be considered rules may be minimized. For example, a rule in the primary table may have a maximum secondary index field value of 3. If a packet is determined to match the primary table rule, then (e.g., based on the maximum secondary index field), the transmitting device may determine that the first 3 rules of the secondary table should also be checked, e.g., since they have a higher precedence value than the matched rule from the primary table. As a different example, if the rule in the primary table has a maximum secondary index field value of 0, then the current matching rule in primary table may be considered the final matching rule. In this case, the transmitting device may determine that no rule in the secondary table needs to be checked. A maximum secondary index field value of 0 may occur either if all rules in secondary table have a lower precedence value (e.g., than the current rule in the primary table) or if the secondary table is empty.

In some embodiments, a last rule of the primary table may be a "matching all" rule (e.g., a default rule). The matching all rule may have a lowest precedence value. This may ensure that for every packet at least one rule in primary table is matching. For instance, a 4G network may specify a default EPS-ID, which can be added into matching-all rule. In 5G a default bearer can be configured. Thus, a matching all rule may be configured to match any packet (e.g., which does not match another rule of higher precedence) to the default EPS-ID or default bearer (e.g., a default bearer ID). In some embodiments, a matching all rule may be configured by the network (e.g., in 502). If a network does not configure a matching all rule, the UE (or other transmitting device) may configure a matching rule autonomously.

The matching all rule may contain a maximum secondary index value, e.g., indicating the number of rules in the secondary table with higher precedence. In some embodiments, the maximum secondary index value of the matching all rule may be set to the number of rules in the secondary table, e.g., indicating that all secondary rules are higher precedence than the matching all rule.

In some embodiments, the matching all rule may indicate that any packet filtered according to the matching all rule (e.g., a packet not matching any other rule of the primary table or any rule of the secondary table with higher precedence than the matching all rule) may be dropped. For example, the matching all rule may include a special bearer ID indicating that any packet associated with that bearer ID may be dropped (e.g., may be discarded without being transmitted). Thus, by configuring the matching all rule the network and/or transmitting device may be control whether a packet (e.g., which does not match any higher precedence rule) may be discarded (e.g., dropped) or routed to a default bearer. In some embodiments, a packet matched with such a special bearer ID may be returned to the higher layer, e.g., so that the higher layer may determine whether to re-generate the packet, potentially with different header information.

In addition to the primary and secondary tables, a flow ID database may be initialized and maintained. The flow ID database may store flow IDs matched to rule index values of corresponding rules in the primary table. In other words, once a flow ID (e.g., provided by a higher layer) is determined (e.g., by a lower label) to match a particular rule in the primary table, the flow ID may be associated with the rule index value of the primary table rule. Each time there is a match between a packet and a rule in the primary table, the flow ID of the packet may be stored in the flow ID database together with the index of the rule in primary table (e.g., if the pair of the flow ID and rule index is not already in the database). For example, a packet with flow ID 45294 may have a matching rule in the primary table at rule index 5. Then, flow ID 45294 and index 5 may be stored together in the flow ID database. Thus, the transmitting device may find the matching rule of all subsequent packets of the same flow (with same flow ID), just by searching the flow ID in the flow database. In other words, the flow ID database may allow the device to avoid evaluating the packet using any rules of the primary table if the flow ID is matched to a rule index in the flow ID database. Verification of flow ID values may cost much less effort (e.g., processor cycles and/or memory accesses) than checking a rule to determine whether the rule is applicable or not. The flow ID database may be flushed periodically, e.g., depending on available memory and/or whenever a relevant change in configuration information occurs.

In some embodiments, the tables may also support access-stratum (AS) mapping. For example, the filter rules (e.g., in the primary and/or secondary tables) may contain a field which contains the bearer (e.g., data radio bearer), where the packet should be transferred. For example, in a 2G or 3G context, the AS mapping may be based on NSAPI (e.g., NSAPI implies a bearer). In 4G AS mapping may be based on EPS-ID. In 5G AS mapping may be based on QFI. For example, the QFI value may imply a mapping to a particular bearer.

In some embodiments, the tables may be specific to a packet data network (PDN) session. Multiple sets of tables may be configured, e.g., each PDN session may have a set of tables (e.g., primary, secondary, and/or flow ID database). The sets of tables (e.g., or entries in the tables) may be the same or different for different PDN sessions. For example, for different PDN sessions, the same or different rules may be included in the primary and/or secondary tables, the same rules may have the same or different precedence, and/or flow IDs may be matched to the same or different rules in the flow ID database, etc.

An upper layer of the UE (or other transmitting device) may generate a packet for transmission to the BS (or other receiving device) (504), according to some embodiments. For example, the packet may be generated by an application layer, e.g., executing on an application processor (e.g., processor 302, among various possibilities).

The upper layer may identify the packet with a flow ID. As noted above, the upper layer may select the flow ID based on the 5-tuple or similar information.

The upper layer may generate header information associated with the packet. The header information may include various fields (see, e.g., FIG. 6). The fields may include a 5-tuple of an IP header. The fields may include some or all of the information upon which the flow ID is based.

The upper layer may pass the packet (e.g., along with the flow ID and header information) to a lower layer of the UE (or other transmitting device). The lower layer may operate on the same processor and/or different processor than the upper layer. For example, the lower layer may operate on a baseband processor, as a component of a cellular modem, as a component of communication circuitry 330, etc. The lower layer may implement a protocol stack such as a 3GPP protocol stack, among various possibilities.

The lower layer of the UE (or other transmitting device) may perform filtering and/or mapping for the packet (506), according to some embodiments. The lower layer may perform NAS filtering and/or AS mapping, among various possibilities. The lower layer may perform the filtering and mapping using the tables (e.g., configured in 503). In other words, the lower layer may determine one of the filtering rules (e.g., configured in 502 and added to a table in 503) that the packet matches. In some embodiments, the lower layer may first use the flow ID database (e.g., if a flow ID is provided with the packet) (506a), then use the primary table (506b), and then use the secondary table (506c). In some embodiments, one or more of the tables may not be used (e.g., may be skipped). The process of finding the appropriate filter rule is explained in further detail below.

In some embodiments, if the higher layer has forwarded a flow ID together with the packet, the flow ID may be used (e.g., re-used) for filtering and/or mapping (506*a*). The lower layer may search the flow ID database (e.g., for a PDN session associated with the packet). If the flow ID is found, the lower layer may determine a primary rule index stored in the flow ID database with the flow ID.

The lower layer may then search the primary table (506*b*), according to some embodiments. If a primary rule index is stored in the flow ID database with the flow ID, then the search may consist of looking up the rule by the rule index. If the flow ID is not found in the flow database, the lower layer may begin evaluating the packet by comparing its header information to the criteria of the respective rules of the primary table. The lower layer may begin with the highest precedence rule in the primary table and may stop at the earliest rule in the primary table that matches the packet. Thus, the lower layer may iteratively evaluate rules in order of precedence until a match is found. For example, the lower layer may stop searching the primary table when the packet is found to match the criterion/criteria of a rule. Thus, the lower layer may determine which rule in the primary table the packet matches, e.g., either based on the rule index (e.g., if the flow ID is found in the flow ID database) or based on evaluating the header information (e.g., if the flow ID is not found).

After the matching rule in the primary table is determined, the lower layer may determine the maximum secondary index value associated with the matching rule in the primary table. If the maximum secondary index value is greater than zero (e.g., indicating the number of rules of the secondary table that are higher precedence), then the lower layer may proceed to the secondary table. If the maximum secondary index value is zero (e.g., indicating that no rules of the secondary table are higher precedence), then the matching rule from the primary table may be considered the matching rule for the packet.

If the maximum secondary index value is greater than zero, the lower layer may then proceed to iteratively evaluate the packet (e.g., based on its header information) according to the filter rules in the secondary table (506*c*). The lower layer may begin with the highest precedence rule in the secondary table and may stop at the earlier of: any rule in the secondary table that matches the packet or the secondary rule index associated with the primary rule. In other words, the lower layer may iteratively evaluate rules until a match is found or the number of rules (e.g., indicated by the maximum secondary rule index) is reached without finding a match.

In the event that a matching rule in the secondary table is found, then that rule may have a higher precedence than the matching rule in the primary table. Accordingly, the matching rule from the secondary table may be determined to be the (e.g., best) match for the packet. In the event that no matching rule in the secondary table is found, then the matching rule from the primary table may be determined to be the (e.g., best) match for the packet.

Thus, via the filtering process, the lower layer may determine a (e.g., single) matching rule (e.g., identified by a matching-ID) that is the highest precedence match for the packet, e.g., from either the primary or secondary table.

In some embodiments, filtering may be performed using the flow ID (e.g., as discussed with respect to 506*a*) whether the upper layer and lower layer operate on the same or different processors. If the layers are executing on the same processor, the filtering may be even more efficient.

The lower layer may update the flow ID database (508), according to some embodiments. For example, if the flow ID of the packet was not found in the flow database (e.g., in 506*a*), then the flow ID may be added to the flow ID database in association with the primary rule index of the matching rule in the primary table for the packet. As noted above, the rules in the primary table may be based on the fields that encode the same information as used to assign flow ID values (e.g., at the higher layer). Thus, by adding the flow ID and associated primary rule index to the flow ID database, the lower layer may avoid evaluating future packets with the same flow ID using rules in the primary table (e.g., because the lower layer may be able to look up the primary rule index in the flow ID database).

If the flow ID was found (e.g., in 506*a*) in the flow ID database, then no update may be performed, according to some embodiments.

The lower layer of the UE (e.g., or other transmitting device) may transmit the packet to the BS (e.g., or other receiving device) (510), according to some embodiments. The lower layer may transmit the packet according to the mapping and/or filtering determined (e.g., in 506). For example, the lower layer may transmit the packet on a bearer or flow associated with the matching rule. Similarly, the lower layer may transmit the packet with an indication of QoS characteristics associated with the matching rule.

FIG. 6—Packet Filtering Fields

FIG. 6 illustrates possible fields of a header which may be considered within a filter rule, according to some embodiments. The header may be a layer 3 (e.g., network layer, RRC) or layer 4 (e.g., transport layer, UDP, TCP, etc.) header, among various possibilities. As shown, different attributes (e.g., fields) may be used in context of different protocols (e.g., IPv4, IPv6, TCP/UDP/stream control transmission protocol (STCP), and/or Encapsulated Security Payload (ESP) and Authentication Header (AH) (e.g., which may be security protocols used in VPNs).

Figure 7:
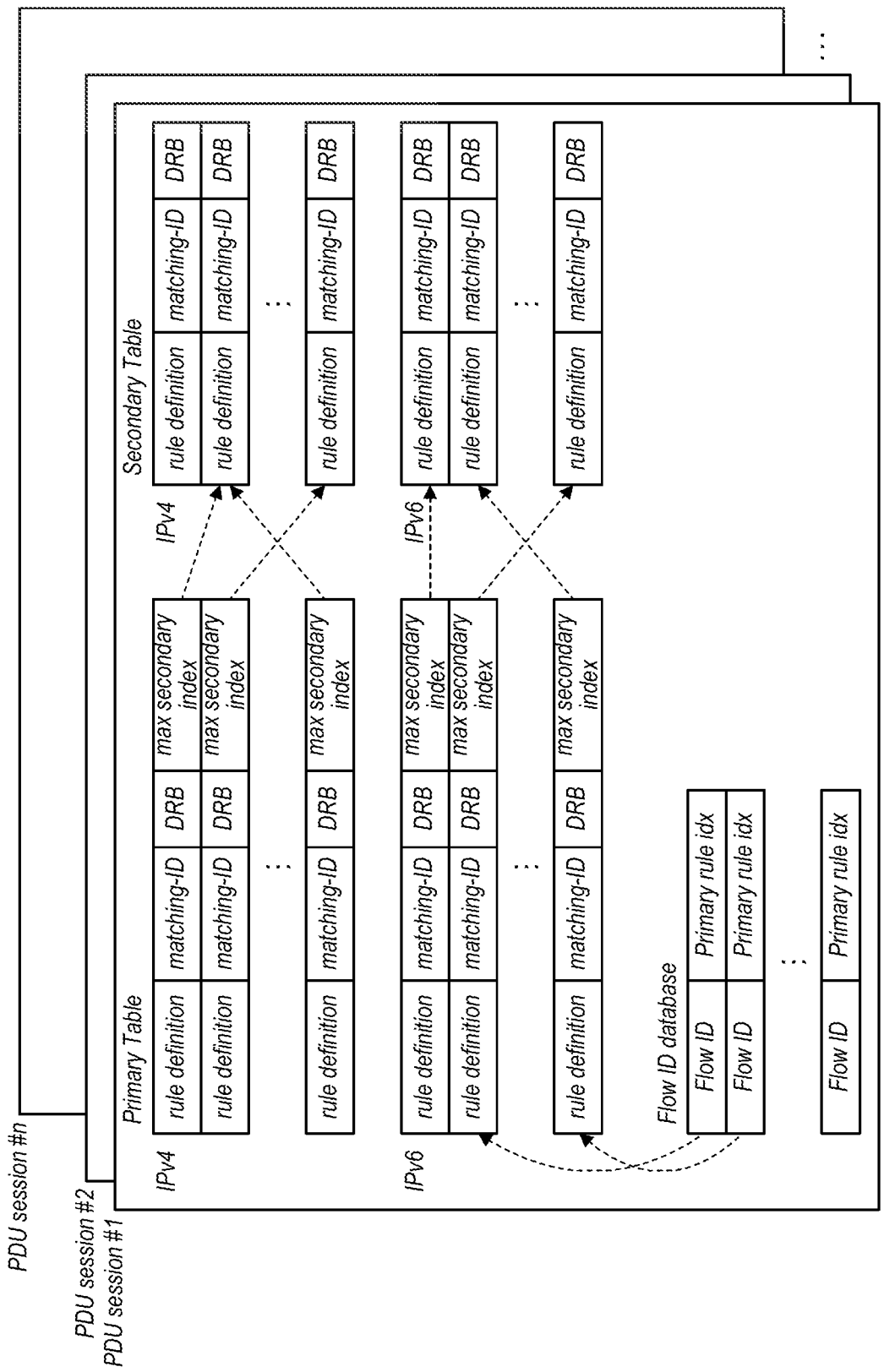
FIG. 7 illustrates a possible table structure, according to some embodiments.

FIG. 7—Packet Filtering Tables

FIG. 7 illustrates a possible table structure, according to some embodiments. For example, a device configuring tables as discussed with respect to 503 may generate tables as illustrated.

As shown, different sets of tables may be configured for different PDU sessions, e.g., PDU sessions 1-n. For each set of tables, a primary table may be divided into two (or any number of) portions associated with different protocols, e.g., IPv4 and IPv6 portions in the illustrated example. Similarly, for each set of tables, a secondary table may be divided into portions associated with the different protocols. Further, for each set of tables, a flow ID database may be configured.

The primary table may include any number of filter rules, e.g., shown as rows. Each filter rule in the primary table may include a rule index (not shown), a rule definition, a matching-ID, a bearer (e.g., a DRB ID), and a maximum secondary index. The rules may be sorted by precedence. When evaluating a packet according to rules of the primary table (e.g., as in 506*b*), the lower layer may begin with the highest precedence rule and may proceed until a matching rule is found. Once a matching rule is found, the lower layer may either begin searching for a matching rule (of higher precedence) in the secondary table (e.g., as in 506*c*) if the maximum secondary index is greater than zero or, if the maximum secondary index is not greater than zero transmit the packet according to the matching-ID and/or DRB.

The maximum secondary index may identify a lowest precedence rule in the secondary table that is of higher precedence than the rule in the primary table (e.g., illustrated by the dotted arrows). Note that the maximum secondary index may refer to the corresponding portion of the secondary table (e.g., for a rule in the IPV4 portion of the primary table, the maximum secondary index may refer to a rule in the IPV4 portion of the secondary table). Thus, any packet may only be evaluated according to rules in the appropriate portion of the primary and secondary tables (e.g., an IPV4 packet will only be evaluated using IPv4 rules, not IPv6 rules).

The secondary table may include any number of filter rules, e.g., shown as rows. Each filter rule in the secondary table may include a rule index (not shown), a rule definition, a matching-ID, and a bearer (e.g., a DRB ID). The rules may be sorted by precedence. When evaluating a packet according to rules of the secondary table (e.g., as in 506c), the lower layer may begin with the highest precedence rule and may proceed until a matching rule is found or the maximum secondary index is reached and that rule does not match the packet. If a matching rule is found in the secondary table, the lower layer may transmit the packet according to the matching-ID and/or DRB for the matched rule in the secondary table. If a matching rule is not found in the secondary table (e.g., at or prior to the maximum secondary index), the lower layer may transmit the packet according to the matching-ID and/or DRB for the matched rule in the primary table.

The flow ID database may include any number of flow IDs matched to rule index values for primary table rules. If a packet's flow ID is found in the flow ID database (e.g., as in 506a), the lower layer may determine that the packet matches the corresponding rule of the primary table (e.g., as shown by the curved dashed arrows) and may proceed without evaluating the packet using any of the rule definitions of the primary table. If the packet's flow ID is not found, the lower layer may search the primary table (e.g., as in 506b) and may add the flow ID (along with a matching primary rule index) to the flow ID database (e.g., as in 508).

In some embodiments, the flow ID database may be divided into portions as described for the primary and secondary tables. In some embodiments, a combined flow ID database (e.g., for multiple protocols) may be used.

Figure 8:
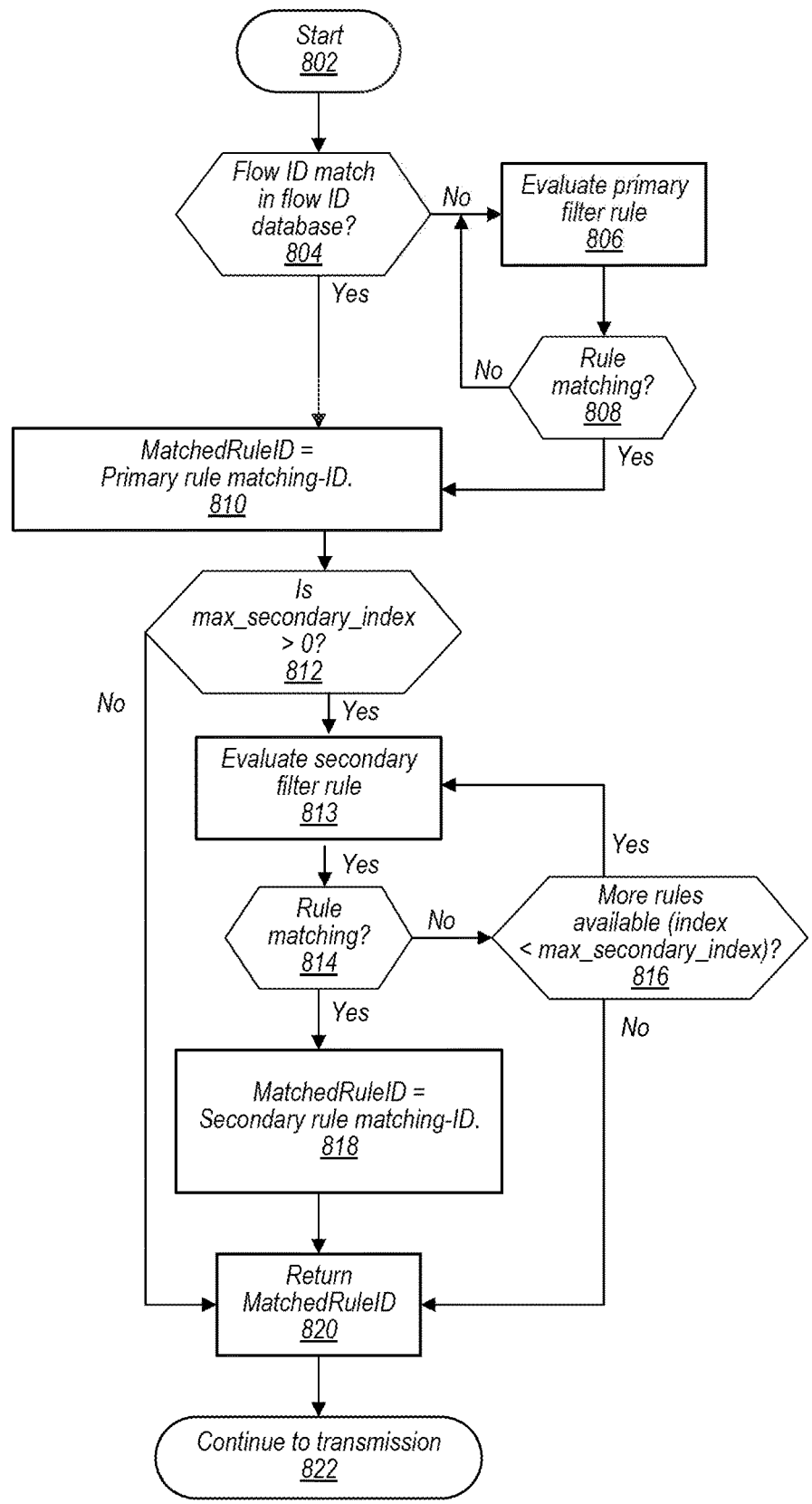
FIG. 8 illustrates an example process for filtering a packet, according to some embodiments.

FIG. 8—Packet Filtering Procedures

FIG. 8 illustrates an example process for filtering a packet, according to some embodiments. For example, FIG. 8 illustrates a detailed implementation of the filtering and mapping process described above with respect to 506 of FIG. 5. In various embodiments, some of the elements of the methods shown in FIG. 8 may be performed concurrently, in a different order than shown, may be substituted for by other method elements, or may be omitted. Additional method elements may also be performed as desired. Aspects of the method of FIG. 8 may be implemented by a UE, such as the UEs 106 or 107, a cellular network, and/or one or more BS 102, e.g., as illustrated in and described with respect to the Figures, or more generally in conjunction with any of the computer systems, circuitry, elements, components or devices shown in the Figures, among other devices, as desired. For example, one or more processors (or processing elements) (e.g., processor(s) 302, 404, baseband processor(s), processor(s) associated with communication circuitry such as 330, 332, 334, 336, 430, or 432, processors associated with various core network elements, etc., among various possibilities) may cause a UE, network element, and/or BS to perform some or all of the illustrated method elements. Note that while at least some elements of the method of FIG. 8 are described in a manner relating to the use of communication techniques and/or features associated with LTE, NR, and/or 3GPP specification documents, such description is not intended to be limiting to the disclosure, and aspects of the method of FIG. 8 may be used in any suitable wireless communication system, as desired. Similarly, while at least some elements of the method of FIG. 8 are described in a manner relating to uplink transmissions performed by a UE, it will be appreciated that aspects of the method of FIG. 8 may similarly be used for downlink transmissions performed by a BS and/or between multiple UEs (e.g., sidelink and/or device to device (D2D) transmissions, etc.). For example, any type of transmitting device may use aspects of the method of FIG. 8, according to some embodiments. As shown, the method may operate as follows.

A lower layer may receive a packet from an upper layer and may start the filtering and mapping process for that packet (802), according to some embodiments.

The lower layer may identify a flow ID of the packet and determine whether the flow ID is found in the flow ID database (804), according to some embodiments (e.g., as in 506a).

If the flow ID database does not include the packet's flow ID, the lower layer may proceed to search the primary table (e.g., as in 506b) for a matching rule as shown in 806 and 808. The lower layer may evaluate the packet using a first rule (e.g., of highest precedence) of the primary table (806). The lower layer may determine whether the packet matches the first rule (808). If the packet does not match the first rule, then the lower layer may return to 806 to evaluate the packet using a next rule (e.g., of next highest precedence). If the packet does match the first rule, then the lower layer may: stop evaluating the packet using further rules of the primary table, proceed to 810, and update the flow ID database to show that the flow ID matches the first rule (e.g., as in 508).

If the flow ID is found in the flow ID database (e.g., in 804), then as a result of finding the flow ID in the flow ID database, the lower layer may determine not to search the primary table for a matching rule. In other words, if the flow ID is found in the database, the lower layer may determine which rule in primary table is matching (e.g., based on the entry in the database, e.g., without evaluating any rules of the primary table). Thus, the lower layer may determine that only the rules in secondary table with higher precedence need to be verified or evaluated. In other words, 806 and 808 may be bypassed as shown.

The lower layer may determine that a matching rule in the primary table is found (810) (e.g., either based on the flow ID being found in the flow ID database as in 804 or based on evaluating a rule as in 806/808), according to some embodiments. The lower layer may set a variable (e.g., MatchedRuleID) to identify the matching rule.

The lower layer may determine whether a maximum secondary index associated with the matching rule in the primary table is greater than 0 (812), according to some embodiments. If so, then the lower layer may proceed to search the secondary table for a matching rule (e.g., as in 506c, for instance as shown in 813, 814, 816, and 818). If not, the lower layer may return the matched rule ID (e.g., from the primary table) (820), according to some embodiments. In other words, based on determining that no rule of the secondary table has higher precedence than the matched rule from the primary table that matches the packet, the lower layer may determine that the matched rule from the primary table is the appropriate match for the packet.

The lower layer may search the secondary table as follows. The lower layer may evaluate the packet using a first rule (e.g., of highest precedence) of the secondary table (813). The lower layer may determine whether the packet matches the first rule (814).

If the packet does not match the first rule, then the lower layer may determine whether more rules are available (e.g., whether the index of the first rule is less than the maximum secondary index associated with the matched primary rule) (816), according to some embodiments. If more rules are available, the lower layer may return to 813 to evaluate the packet using a next rule (e.g., of next highest precedence).

If no more rules are available (e.g., if, in 816, the first rule is the maximum secondary index associated with the matched primary rule, then the lower layer may determine that the packet does not match a rule of the secondary table of higher precedence than the matched rule from the primary table. As a result, the lower layer may return the matched rule ID (e.g., from the primary table) (820), according to some embodiments. In other words, based on determining that no rule of the secondary table (e.g., with higher precedence than the matched rule from the primary table) matches the packet, the lower layer may determine that the matched rule from the primary table is the appropriate match for the packet.

If the packet does match the first rule (e.g., in 814), then the lower layer may set the variable (e.g., MatchedRuleID) to identify the matching rule of the secondary table (818), according to some embodiments. In other words, based on determining that the packet matches a rule of the secondary table with higher precedence than the matched rule from the primary table, the lower layer may determine that the matched rule of the secondary table is the appropriate matching rule for the packet.

After a matched rule ID is returned (e.g., in 820), the lower layer may cause the packet to be transmitted (822), according to some embodiments. The packet may be transmitted according to the matched rule, e.g., using a bearer or flow associated with the matched rule.

Additional Information and Embodiments

In a first set of embodiments, a user equipment (UE) may establish communication with a base station and exchange configuration information with the base station (BS) for a plurality of packet filters. The UE may generate, at a higher layer, a first uplink packet for transmission to the base station and may determine, at the higher layer, that the first uplink packet is associated with a first flow identifier. At a lower layer, the UE may determine that the first flow identifier is associated with a first rule index in a flow database. In response to the determination that the first flow identifier is associated with the first rule index in the flow database, the lower layer may evaluate header information of the first uplink packet according to one or more rules of a secondary table, wherein the one or more rules of the secondary table are associated with the first rule index. The lower layer may determine, based on the evaluation of the header information of the first uplink packet using the one or more rules of the secondary table, that the first uplink packet matches a first packet filter of the plurality of packet filters. In response to the determination that the first uplink packet matches the first packet filter, the UE may transmit the first uplink packet to the base station using a flow associated with the first packet filter.

In some embodiments, the determination that the first uplink packet matches the first packet filter is made without evaluating the header information of the first uplink packet according to the first packet filter.

In some embodiments, transmitting the first uplink packet to the base station using a flow associated with the first packet filter comprises both non-access stratum filtering and access stratum mapping.

In some embodiments, the processor may be further configured to cause the UE to: generate, at the higher layer, a second uplink packet for transmission to the base station; determine, at the higher layer, that the second uplink packet is associated with a second flow identifier; and at the lower layer: determine that the second flow identifier is not associated with any rule index in the flow database; in response to the determination that the second flow identifier is not associated with any rule index in the flow database, evaluate header information of the second uplink packet according to one or more rules of a primary table; and determine that the header information of the second uplink packet satisfies a first rule of the primary table.

In some embodiments, the processor is further configured to cause the UE to: in response to the determination that the header information of the second uplink packet satisfies the first rule of the primary table, associate the second flow identifier with the first rule of the primary table in the flow database using a second rule index associated with the first rule of the primary table.

In some embodiments, the processor is further configured to cause the UE to: in response to the determination that the header information of the second uplink packet satisfies the first rule of the primary table, select at least one rule of the secondary table; evaluate the header information of the second uplink packet according to the at least one rule of the secondary table; determine that the header information of the second uplink packet satisfies a first rule of the at least one rule of the secondary table; determine, based on the determination that the header information of the second uplink packet satisfies the first rule, that the second uplink packet matches a second packet filter of the plurality of packet filters; and in response to the determination that the second uplink packet matches the second packet filter, transmit the second uplink packet to the base station using a second flow associated with the second packet filter, wherein the second flow is distinct from the first flow.

In a second set of embodiments, a method may comprise, a at a lower level of a transmitting device configuring a plurality of rules for filtering packets, wherein the plurality of rules are useable to evaluate respective packets based on respective header information of the respective packets, the respective header information of the respective packets comprising a plurality of fields. The method may further comprise, generating a first table comprising a first subset of the plurality of rules, wherein respective rules of the first subset of the plurality of rules are based on a first subset of the plurality of fields usable to determine respective flow identifiers for respective packets. The method may further comprise, generating a second table comprising a second subset of the plurality of rules disjoint from the first subset of the plurality of rules, wherein respective rules of the second subset of the plurality of rules are based at least in part on a second subset of the plurality of fields not usable to determine respective flow identifiers for respective packets. The method may further comprise filtering at least one packet according to the first table and the second table; and transmitting the at least one packet according to a result of the filtering.

In some embodiments, respective rules of the plurality of rules for filtering packets are associated with respective precedence values; generating the first table comprises sorting the first subset of the plurality of rules according to precedence; and generating the second table comprises sorting the second subset of the plurality of rules according to precedence.

In some embodiments, said filtering the at least one packet comprises: evaluating a first packet by respective rules of the first subset of the plurality of rules beginning with a first rule associated with highest precedence; continuing to evaluate the first packet by respective rules of the first subset of the plurality of rules in order of precedence; and stopping evaluating the first packet according to further rules of the first subset of the plurality of rules in response to a determination that the first packet satisfies particular rule of the first subset of the plurality of rules.

In some embodiments, respective rules of the first subset of the plurality of rules are associated with respective index values indicating respective numbers of the second subset of the plurality of rules with higher precedence than the respective rule.

In some embodiments, said filtering the at least one packet comprises: receiving, from a higher level of the transmitting device, a first packet; determining that the first packet satisfies a first rule of the first subset of rules; determining, based on an index value associated with the first rule, a first number of rules of the second subset of the plurality of rules; evaluating the first packet according to the first number of rules of the second subset of the plurality of rules, wherein the first number of rules of the second subset of the plurality of rules are evaluated in order of precedence; determining that the first packet does not match any rule of the first number of rules of the second subset of the plurality of rules; and in response to the determination that the first packet does not match any rule of the first number of rules of the second subset of the plurality of rules, selecting a flow for the first packet according to the first rule of the first subset of rules.

In some embodiments, the method may further comprise, determining not to evaluate the first packet according to further rules of the second subset of the plurality of rules, wherein the determination not to evaluate the first packet according to further rules of the second subset of the plurality of rules is based on evaluating the first packet according to the first number of rules.

In some embodiments, said filtering the at least one packet comprises: receiving, from a higher level of the transmitting device, a first packet; determining that the first packet satisfies a first rule of the first subset of rules; determining, based on an index value associated with the first rule, a first number of rules of the second subset of the plurality of rules; evaluating the first packet according to at least one of the first number of rules of the second subset of the plurality of rules, wherein the first number of rules of the second subset of the plurality of rules are evaluated in order of precedence; determining that the first packet matches a first rule of the first number of rules of the second subset of the plurality of rules; and in response to the determination that the first packet matches the first rule of the first number of rules of the second subset of the plurality of rules, selecting a flow for the first packet according to the first rule of the first number of rules of the second subset of the plurality of rules.

In some embodiments, a lowest precedence rule of the first subset of the plurality of rules comprises a matching all rule and is associated with a default bearer; filtering the at least one packet according to the first table comprises determining that the at least one packet does not match any other rule of the first subset of the plurality of rules and determining that the at least one packet matches the matching all rule; and transmitting the at least one packet according to the result of the filtering comprises transmitting the at least one packet on the default bearer in response to the determination that the at least one packet matches the matching all rule.

In some embodiments, a lowest precedence rule of the first subset of the plurality of rules comprises a matching all rule and is associated with an indication to drop any packet that does not match at least one higher precedence rule of the first subset of the plurality of rules.

In some embodiments, said filtering the at least one packet comprises: receiving, from a higher level of the transmitting device, a first packet identified with a first flow identifier; evaluating header information of the first packet according to at least one rule of the first table; determining that the header information of the first packet matches a first rule of the at least one rule of the first table; and in response to the determination that the header information of the first packet matches the first rule of the at least one rule of the first table, adding a first entry to a flow identifier table, the first entry associating the first flow identifier and the first rule.

In some embodiments, said filtering the at least one packet further comprises: receiving, from the higher level of the transmitting device, a second packet identified with the first flow identifier; and based on the first entry associating the first flow identifier and the first rule, determining that the second packet matches the first rule.

In some embodiments, the first subset of the plurality of rules and the subset of the plurality of rules are mutually exclusive.

In a third set of embodiments, an apparatus may cause a UE to establish communication with a base station and receive, from the base station, configuration information for a plurality of packet filters. The UE may generate a first uplink packet for transmission to the base station and determine that the first uplink packet is associated with a first flow identifier. The UE may determine that the first flow identifier is associated with a first rule index in a flow database, and, in response to the determination that the first flow identifier is associated with the first rule index in the flow database, determine that the first uplink packet satisfies a first rule associated with the first rule index in a primary table without evaluating the first uplink packet using the first rule. The UE may select, based on the determination that the first uplink packet satisfies the first rule, one or more rules of a secondary table, wherein the one or more rules of the secondary table are associated with the first rule. The UE may evaluate the first uplink packet using the one or more rules of the secondary table and determine, based on the evaluation of the first uplink packet using the one or more rules of the secondary table, that the first uplink packet matches a first packet filter of the plurality of packet filters. In response to the determination that the first uplink packet matches the first packet filter, the UE may transmit, to the base station, the first uplink packet using a flow associated with the first packet filter.

In some embodiments, respective packet filters of the plurality of packet filters comprise respective rules based on respective packet header information of respective uplink packets, wherein the determination that the first uplink packet matches the first packet filter is performed without evaluating packet header information of the first uplink packet in relation to rules of the first packet filter.

In various embodiments, various combinations of the embodiments described above may be combined together.

Yet another exemplary embodiment may include a method, comprising: by a wireless device: performing any or all parts of the preceding examples.

Another exemplary embodiment may include a wireless device, comprising: an antenna; a radio coupled to the antenna; and a processing element operably coupled to the radio, wherein the device is configured to implement any or all parts of the preceding examples.

Still another exemplary embodiment may include an apparatus, comprising: a processing element configured to cause a wireless device to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Any of the methods described herein for operating a user equipment (UE) may be the basis of a corresponding method for operating a base station, by interpreting each message/signal X received by the UE in the DL as message/signal X transmitted by the base station, and each message/signal Y transmitted in the UL by the UE as a message/signal Y received by the base station. Moreover, a method described with respect to a base station may be interpreted as a method for a UE in a similar manner.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
at a baseband processor of a transmitting device:
configuring a plurality of rules for filtering packets, wherein the plurality of rules are useable to evaluate respective packets based on respective header information of the respective packets, the respective header information of the respective packets comprising a plurality of fields;
filtering at least one packet according to a first table and a second table, the first table comprising a first subset of the plurality of rules, wherein respective rules of the first subset of the plurality of rules are based on a first subset of the plurality of fields usable to determine respective flow identifiers for respective packets, and wherein the second table comprises a second subset of the plurality of rules that is disjoint from the first subset of the plurality of rules, wherein respective rules of the second subset of the plurality of rules are based at least in part on a second subset of the plurality of fields not usable to determine respective flow identifiers for respective packets; and
encoding, for transmission, the at least one filtered packet.

2. The method of claim 1, wherein:
respective rules of the plurality of rules for filtering packets are associated with respective precedence values;
the first subset of the plurality of rules is sorted according to precedence; and
the second subset of the plurality of rules is sorted according to precedence.

3. The method of claim 2, wherein said filtering the at least one packet comprises:
evaluating a first packet by respective rules of the first subset of the plurality of rules beginning with a first rule associated with highest precedence;
continuing to evaluate the first packet by respective rules of the first subset of the plurality of rules in order of precedence; and
stopping evaluating the first packet according to further rules of the first subset of the plurality of rules in response to a determination that the first packet satisfies particular rule of the first subset of the plurality of rules.

4. The method of claim 2, wherein respective rules of the first subset of the plurality of rules are associated with respective index values indicating respective numbers of the second subset of the plurality of rules with higher precedence than the respective rule.

5. The method of claim 4, wherein said filtering the at least one packet comprises:
receiving, from an application layer of the transmitting device, a first packet;
determining that the first packet satisfies a first rule of the first subset of rules;
determining, based on an index value associated with the first rule, a first number of rules of the second subset of the plurality of rules;

evaluating the first packet according to the first number of rules of the second subset of the plurality of rules, wherein the first number of rules of the second subset of the plurality of rules are evaluated in order of precedence;

determining that the first packet does not match any rule of the first number of rules of the second subset of the plurality of rules; and in response to the determination that the first packet does not match any rule of the first number of rules of the second subset of the plurality of rules, selecting a flow for the first packet according to the first rule of the first subset of rules.

6. The method of claim 5, further comprising determining not to evaluate the first packet according to further rules of the second subset of the plurality of rules, wherein the determination not to evaluate the first packet according to further rules of the second subset of the plurality of rules is based on evaluating the first packet according to the first number of rules.

7. The method of claim 4, wherein said filtering the at least one packet comprises:

receiving, from an application layer of the transmitting device, a first packet;

determining that the first packet satisfies a first rule of the first subset of rules;

determining, based on an index value associated with the first rule, a first number of rules of the second subset of the plurality of rules;

evaluating the first packet according to at least one of the first number of rules of the second subset of the plurality of rules, wherein the first number of rules of the second subset of the plurality of rules are evaluated in order of precedence;

determining that the first packet matches a first rule of the first number of rules of the second subset of the plurality of rules; and in response to the determination that the first packet matches the first rule of the first number of rules of the second subset of the plurality of rules, selecting a flow for the first packet according to the first rule of the first number of rules of the second subset of the plurality of rules.

8. The method of claim 2, wherein a lowest precedence rule of the first subset of the plurality of rules comprises a matching all rule and is associated with a default bearer;

wherein filtering the at least one packet according to the first table comprises determining that the at least one packet does not match any other rule of the first subset of the plurality of rules and determining that the at least one packet matches the matching all rule; and wherein encoding, for transmission, the at least one filtered packet comprises encoding, for transmission, the at least one packet on the default bearer in response to the determination that the at least one packet matches the matching all rule.

9. The method of claim 2, wherein a lowest precedence rule of the first subset of the plurality of rules comprises a matching all rule and is associated with an indication to drop any packet that does not match at least one higher precedence rule of the first subset of the plurality of rules.

10. The method of claim 1, wherein said filtering the at least one packet comprises:

receiving, from an application layer of the transmitting device, a first packet identified with a first flow identifier;

evaluating header information of the first packet according to at least one rule of the first table;

determining that the header information of the first packet matches a first rule of the at least one rule of the first table; and in response to the determination that the header information of the first packet matches the first rule of the at least one rule of the first table, adding a first entry to a flow identifier table, the first entry associating the first flow identifier and the first rule.

11. The method of claim 10, wherein said filtering the at least one packet further comprises:

receiving, from the application layer of the transmitting device, a second packet identified with the first flow identifier; and based on the first entry associating the first flow identifier and the first rule, determining that the second packet matches the first rule.

12. The method of claim 1, wherein the first subset of the plurality of rules and the second subset of the plurality of rules are mutually exclusive.

13. An apparatus, comprising:

a baseband processor configured to perform operations comprising:

configuring a plurality of rules for filtering packets, wherein the plurality of rules are useable to evaluate respective packets based on respective header information of the respective packets, the respective header information of the respective packets comprising a plurality of fields;

filtering at least one packet according to a first table and a second table, the first table comprising a first subset of the plurality of rules, wherein respective rules of the first subset of the plurality of rules are based on a first subset of the plurality of fields usable to determine respective flow identifiers for respective packets, and wherein the second table comprises a second subset of the plurality of rules that is disjoint from the first subset of the plurality of rules, wherein respective rules of the second subset of the plurality of rules are based at least in part on a second subset of the plurality of fields not usable to determine respective flow identifiers for respective packets; and encoding, for transmission, the at least one filtered packet.

14. The apparatus of claim 13, wherein said filtering the at least one packet comprises:

receiving, from an application layer, a first packet identified with a first flow identifier;

evaluating header information of the first packet according to at least one rule of the first table;

determining that the header information of the first packet matches a first rule of the at least one rule of the first table; and in response to the determination that the header information of the first packet matches the first rule of the at least one rule of the first table, adding a first entry to a flow identifier table, the first entry associating the first flow identifier and the first rule.

15. The apparatus of claim 14, wherein said filtering the at least one packet further comprises:

receiving, from the application layer, a second packet identified with the first flow identifier; and based on the first entry associating the first flow identifier and the first rule, determining that the second packet matches the first rule.

16. The apparatus of claim 13, wherein the first subset of the plurality of rules and the second subset of the plurality of rules are mutually exclusive.

17. A transmitting device, comprising:
memory comprising program instructions; and
a processor configured to execute the program instructions, wherein the program instructions are configured to, when executed by the processor, cause the transmitting device to perform operations comprising:
configuring a plurality of rules for filtering packets, wherein the plurality of rules are useable to evaluate respective packets based on respective header information of the respective packets, the respective header information of the respective packets comprising a plurality of fields;
filtering at least one packet according to a first table and a second table, the first table comprising a first subset of the plurality of rules, wherein respective rules of the first subset of the plurality of rules are based on a first subset of the plurality of fields usable to determine respective flow identifiers for respective packets, and wherein the second table comprises a second subset of the plurality of rules that is disjoint from the first subset of the plurality of rules, wherein respective rules of the second subset of the plurality of rules are based at least in part on a second subset of the plurality of fields not usable to determine respective flow identifiers for respective packets; and
transmitting the at least one filtered packet.

18. The transmitting device of claim 17, wherein:
respective rules of the plurality of rules for filtering packets are associated with respective precedence values;
the first subset of the plurality of rules is sorted according to precedence; and
the second subset of the plurality of rules is sorted according to precedence.

19. The transmitting device of claim 18, wherein said filtering the at least one packet comprises:
evaluating a first packet by respective rules of the first subset of the plurality of rules beginning with a first rule associated with highest precedence;
continuing to evaluate the first packet by respective rules of the first subset of the plurality of rules in order of precedence; and
stopping evaluating the first packet according to further rules of the first subset of the plurality of rules in response to a determination that the first packet satisfies particular rule of the first subset of the plurality of rules.

20. The transmitting device of claim 17, wherein respective rules of the first subset of the plurality of rules are associated with respective index values indicating respective numbers of the second subset of the plurality of rules with higher precedence than the respective rule.

* * * * *